April 16, 1963 G. ALFIERI 3,085,836
TRIPLEX DISTRIBUTOR COMPRESSED AIR VEHICLE AND TRAILER
BRAKING INSTALLATION WITH AUXILIARY HAND CONTROL
Filed March 8, 1960 2 Sheets-Sheet 2
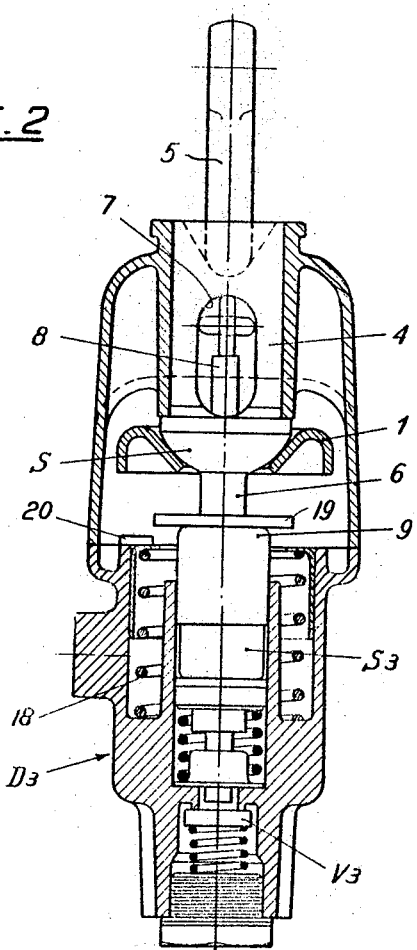
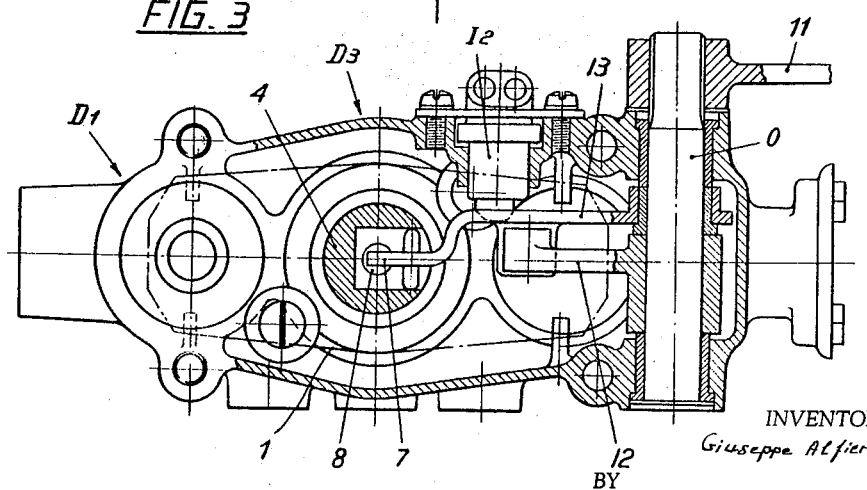
INVENTOR.
Giuseppe Alfieri
BY
Michael S. Striker

United States Patent Office 3,085,836
Patented Apr. 16, 1963

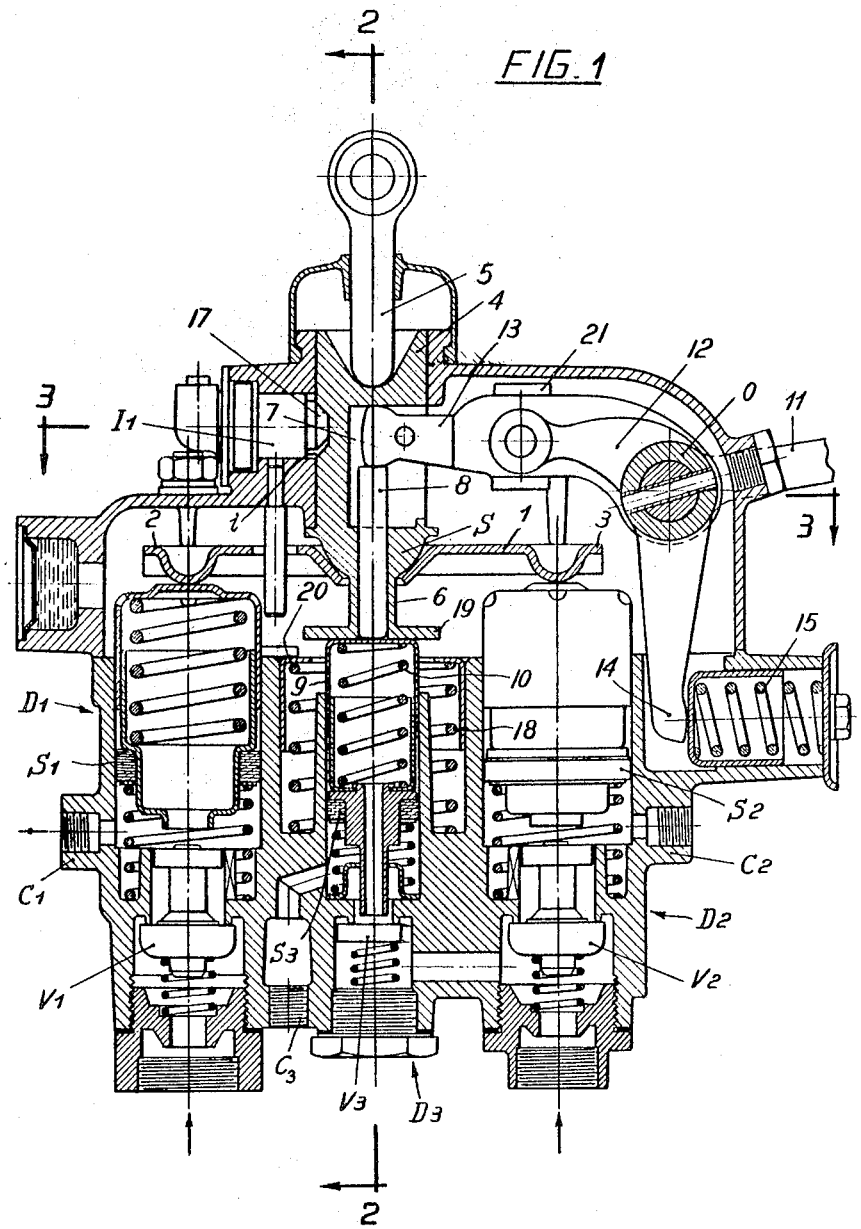

3,085,836
TRIPLEX DISTRIBUTOR COMPRESSED AIR VEHICLE AND TRAILER BRAKING INSTALLATION WITH AUXILIARY HAND CONTROL
Giuseppe Alfieri, Milan, Italy, assignor to Fabbrica Italiana Magneti Marelli S.p.A., Milan, Italy
Filed Mar. 8, 1960, Ser. No. 13,640
Claims priority, application Italy Mar. 26, 1959
7 Claims. (Cl. 303—53)

The present invention relates to a compressed air distributor having three distributing sections for pneumatic braking installations of combined vehicles and trailers, and of the type in which the control of the distributing sections is accomplished by a balancing element operated by a push control rod connected to the foot brake pedal, and the auxiliary braking of at least one part of the vehicle is obtained by a hand operated device.

As is commonly known, auxiliary braking of combined vehicles, is normally effected on the trailer or semi trailer, and the manual operation of the section to be braked is obtained by means of an auxiliary distributor, accessible from the driving seat.

The installation of an individual distributor for the auxiliary braking obviously entails a major complication in the installation, with the necessity of having to install new delivery pipes connecting the distributor to the air storage tank as well as the delivery pipe to the trailer or semi trailer.

It is also necessary to provide the installation with a valve system, which during the operation of one single distributor (auxiliary or normal) prevents the delivery pipe from exhausting to the atmosphere through a distributor remaining inactive.

In order to obviate the necessity of an individual auxiliary distributor, duplex distributors have been evolved, having one section connected to the motor vehicle unit, and the other to the trailer or semi trailer, and in which the distributing section, activated by foot pedal during normal braking of the trailer, is also activated to obtain the auxiliary braking. The auxiliary control of this section is again obtained by means of a hand device situated at the driving seat.

The employment of such duplex distributors is however limited to such combined vehicles in which the motor vehicle unit embodies a single braking unit section, and therefore they cannot be used in motor units which require a distributing section for each axle.

The aim of the present invention is to create a new type of distributor having three sections, suitable for use in combined vehicles, where the motor vehicle unit is provided with braking sections for the individual axles, and further having a hand operated device for the operation of the section connected to the trailer during the auxiliary braking.

According to the invention, the distributor comprises three distributing sections, two situated at the sides of the apparatus, and respectively connected to the rear and front axles of the motor vehicle unit, while the third is centrally situated in the apparatus, and connected to the braking system of the trailer or semi trailer.

The operation of the two lateral sections during normal braking is obtained by means of a balancing element on which a piston operates, and said piston being controlled by a push rod connected to the foot pedal, while control of the trailer section is accomplished directly by the piston.

This latter is constructed in such a manner so as to house and guide an inner rod, which in the trailer auxiliary braking phase acts on the trailer distributor by means of the hand control device.

Only during normal braking does the operating load become stabilized, and after an initial run in which the motor vehicle braking device intervenes, and which is operated by a pre-loaded spring acting against the aforesaid mentioned piston.

The successive movement of the piston causes proper operation of the trailer distributor, which comes into action ahaed of the lateral distributors.

The manual operated device used during auxiliary braking of the trailer not only operates the corresponding section by means of the control push rod, but functions also to control the stop switch, and the device is also operatively connected to the piston, so that the stop switch is also operated during the normal braking phase.

Other features of the invention will be described with reference to the accompanying drawings, which show only by way of example an embodiment of the triplex distributor as embodied in the invention.

FIG. 1 of the drawings is a longitudinal cross section through the triplex distributor of the present invention;

FIG. 2 is a cross section taken along line 2—2 of FIG. 1; and

FIG. 3 is a cross section taken along line 3—3 of FIG. 1.

The feed distributors connected to the motor unit braking sections are shown as $D_1$, $D_2$ while $D_3$ indicates the central distributor connected to either the trailer or semi trailer braking sections.

The sections essentially comprise control pistons $S_1$, $S_2$ and $S_3$, respectively each having an operating member inlet valve $V_1$, $V_2$, $V_3$ controlled by said operating members, outlets $C_1$, $C_2$, $C_3$ for the braking sections, and an outlet to the compressed air storage tank.

Pistons $S_1$ and $S_2$ are controlled by a balancing element 1, acting with its extremities 2 and 3 through control springs respectively on the pistons.

A piston or hollow block 4, controlled by push rod 5 connected to the foot brake pedal not shown in the drawing, is coupled by means of a semi-spherical portion S to the balancing element 1, in order to transmit to this latter the control action of the motor vehicle distributors $D_1$ and $D_2$, and on the other hand provides directly the operation of distributor $D_3$, by means of a tubular extension 6.

Piston 4 has an ample recess 7 in which to house an operating rod 8, connected to the hand brake device, and sliding within the piston prolongation in such a manner as to operate the distributor $D_3$, either during the movement of the piston, or during the sole operation of the auxiliary hand-operated braking device. Both push rod 8 and the extremity of piston prolongation 6 act on a retainer cap 9 of control spring 10 of distributor $D_3$.

The mechanical device for hand braking of distributor $D_3$ is mounted on the upper part of the apparatus, and lateral to piston 4.

This device comprises the levers 11, 12 fixed to a shaft 0 turnably mounted in the housing of the apparatus and a lever 13 which is freely tiltable mounted on the rotary shaft 0 of the lever system 11, 12 while lever 11 is hand operable from the driving seat by means of suitable linkages, not shown in the drawings. Lever 12 is furnished with an extension 14 subjected to the action of a return spring 15 tending to maintain the lever in the rest position shown in FIG. 1.

Lever 13, which acts on rod 8 housed in the recess 7 of the piston 4 acts with a portion thereof also on the control rod of stop switch $I_2$ to control the operation of the latter.

The operation of lever 13, and hence the movement of rod 8, is obtained by means of lever 12 put into rotation by lever 11 during the manually controlled phase of the auxiliary braking device. On one side of piston 4 there is a notch $i$ in which is engaged the operating rod 17 of a cut-off switch I, of the motor vehicle braking device, which is operated during the initial run by the piston 4 to cause operation of an engine braking system, and the braking action of which precedes that given to the distributors.

The successive operating of the distributors is made noticeable to the driver by the reaction of a preloaded spring 18 established in a housing situated around distributor $D_3$.

The effect of the additional spring 18 will be felt by the operator when after an initial run the plate-shaped member 19 connected to piston 4 by the extension 6 engages the upper supporting cap 20 of said spring.

The drawings of the triplex distributor show the assembly in the rest position.

The functioning of the device during normal braking or by foot pedal is as follows:

The driver, acting on the brake pedal causes displacement of the push rod 5, and hence movement of piston 4, which by means of the balancing element 1 activates the distributors $D_1$ and $D_2$, and by means of its extension 6 activates distributor $D_3$.

With the movement of the piston, simultaneous movement of the piston inner rod 8 takes place.

It is to be noted that during the initial run, and before the distributors go into operation, the piston activates the unit brake shut-off switch $I_1$ by means of the engagement between recess $i$ and the operating push rod 17 of said shut-off switch.

The operating effect of this latter continues even after the initial run, inasmuch as rod 17 is maintained in the operating position by the lateral surface of the piston.

Already from the first movement of the piston 4, the stop switch $I_2$ becomes activated, since downward movement of piston 4 causes the rotation of lever 13 which in turn will cause operation of switch $I_2$, which controls in a known manner signaling means.

The proper operation of the distributors $D_1$, $D_2$, and $D_3$ is made noticeable to the driver by the amount of exertion required to overcome the reaction of preloaded spring 18.

This additional spring 18 makes its effect felt as soon as the piston 4 is displaced enough to bring its member 19 connected thereto in contact with the support cap 20 of said spring.

However, the activation of distributors $D_1$, $D_2$, and $D_3$ can be non-simultaneous.

In the event that operation of the trailer distributor $D_3$, is desired before operation of the distributors $D_1$ and $D_2$, the end of the operating member of the piston $S_3$ is spaced in the rest position of the apparatus a distance from the valve $V_3$ which is smaller than the spacing between the ends of the operating members of pistons $S_1$ and $S_2$ and valves $V_1$ and $V_2$, respectively, in such a manner as to obtain delivery of pressure fluid to the trailer braking section ahead of delivery of pressure fluid to the motor unit braking sections. Said advance delivery can be gradually reduced up to the point of achieving complete equilibrium in all the delivery pipes. During pedal braking, and rotation of lever 13 through piston 4, the kinematics of the hand control remain in the rest position, inasmuch as lever 13 is freely turnable mounted on the rotary shaft 0 of the lever system 11, 12.

The operation of the hand operated mechanical device occurs when the driver manipulates lever 11.

During rotation of lever 11, lever 12 is likewise turned and engages with its free end one of the lateral projections 21 fixed to lever 13 and causes the rotation of lever 13, which in turn moves rod 8, with which it is associated.

This latter acts on the control spring 10 of piston $S_3$ which provides the operation of distributor $D_3$.

Turning of lever causes also the operation of cut-off switch $I_2$. Further, the desired control load is given by the compression of spring 15 by means of extension 14 of lever 12.

With the cessation of the control action, the same spring 15 brings the lever system 11, 12 back to the rest position.

It is to be noted, that the coupling system of leverage 12, 13 during the main foot pedal control operation, allows lever 12 to remain in the neutral position with its extension 14 engaged against reacting spring 15, and allows for the operation of the trailer distributor with a low pressure head during normal braking operations.

A further feature of the distributing installation resides in the fact that the piston $S_3$ of the distributor $D_3$ is constructed with smaller dimensions than the pistons of the distributors $D_1$ and $D_2$ in such a manner that the operating load required by $D_3$ is less than that required by $D_1$ and $D_2$; so that the entire operating load is almost exclusively required by the two distributors $D_1$ and $D_2$.

I claim:

1. A triplex distributor arrangement for regulating the flow of pneumatic braking fluid to three braking sections each of which controls a set of wheels in a composite vehicle, comprising a housing; a hollow block slidably mounted in said housing; first operator-controlled actuating means for reciprocating said block between an operative position and an idle position; a first fluid distributor for one of said sections and two additional fluid distributors for the other sections, said distributors mounted in said housing and each thereof having a normally closed valve adapted to admit fluid to the respective section, the valve of said first distributor located in the path of said block so as to open when the block is moved to said operative position; rocker means mounted on and movable with said block, said rocker means having portions engaging and opening the valves of said additional distributors when the block is moved to said operative position; a push rod slidably extending through said block and adapted to engage the valve of said first distributor; and second operator-controlled actuating means mounted in said housing for moving said push rod with respect to said block so as to open the valve of said first distributor independently of the other valves.

2. A distributor arrangement as set forth in claim 1, wherein said block comprises a tubular extension engaging the valve of said first distributor and said push rod extends through said extension.

3. A distributor arrangement as set forth in claim 2, wherein said extension has an operating end spaced in the idle position of said block farther from the valve of said first distributor than the spacing between said engaging portions of said rocker means and the valves of said additional distributors so that said extension opens the valve of said first distributor before said rocker means opens the valves of said additional distributors when the block is moved from said idle position to said operative position.

4. An arrangement for regulating the flow of compressed braking fluid to at least three braking sections each of which controls a set of wheels in a composite vehicle, comprising housing means; a plurality of fluid distributors including a first distributor for one of said braking sections and two additional distributors for the other braking sections, said distributors mounted in said housing means and each thereof comprising normally closed valve means adapted to admit fluid to the respective braking section; first operator-controlled actuating means mounted in and movable with respect to said housing means between an operative and an idle position, said actuating means operatively connected with said distributors so as to open each of said valve means when moved to said operative position; and second operator-controlled actuating means mounted in said housing means and operatively connected with said first distributor for opening the valve means of said first distributor independently of the other valve means, said second actuating means comprising a shaft turnably mounted in said housing, a first lever for reciprocating said push rod, said lever pivotable about said shaft between a first position in which the push rod permits closing of and a second position in which the push rod opens the valve of said first distributor, resilient means mounted in said housing for biasing the lever to said first position, a second lever connected to said shaft and located in said housing, motion transmitting means provided on at least one of said levers for pivoting the first lever to said second position in response to pivoting of said second lever, and a hand-operated third lever connected to said shaft and located externally of said housing for pivoting said second lever so as to move the first lever to said second position.

5. A distributor arrangement as set forth in claim 1, wherein said block comprises a compressing member and further comprising compressible resilient means mounted in said housing and located in the path of so as to be engaged by said compressing member when the block is moved between said idle and operative positions and opens the valve of said first distributor, whereby the resilient means resists movement of the block to said operative position and the operator is aware that the valve of said first distributor is open.

6. A distributor arrangement as set forth in claim 1 for a composite vehicle of the type having an engine braking system and a control circuit for said engine braking system, further comprising normally open switch means connected in said circuit and including trip means extending into the path of said block, said block actuating said trip means to complete said circuit when moved from said idle position to said operative position.

7. A distributor arrangement as set forth in claim 1 for a composite vehicle of the type comprising signalling means and an electric circuit for controlling said signalling means, further comprising normally open switch means connected in said circuit and including trip means mounted in the path of said second actuating means so as to complete said circuit when the second actuating means moves the push rod to open the valve of said first distributor.

References Cited in the file of this patent
UNITED STATES PATENTS 2,964,360   Alfieri _____ Dec. 13, 1960

FOREIGN PATENTS 1,107,239   France _____ Aug. 3, 1955
713,107   Germany _____ Oct. 31, 1941
550,380   Italy _____ Oct. 26, 1956